Patented July 4, 1933

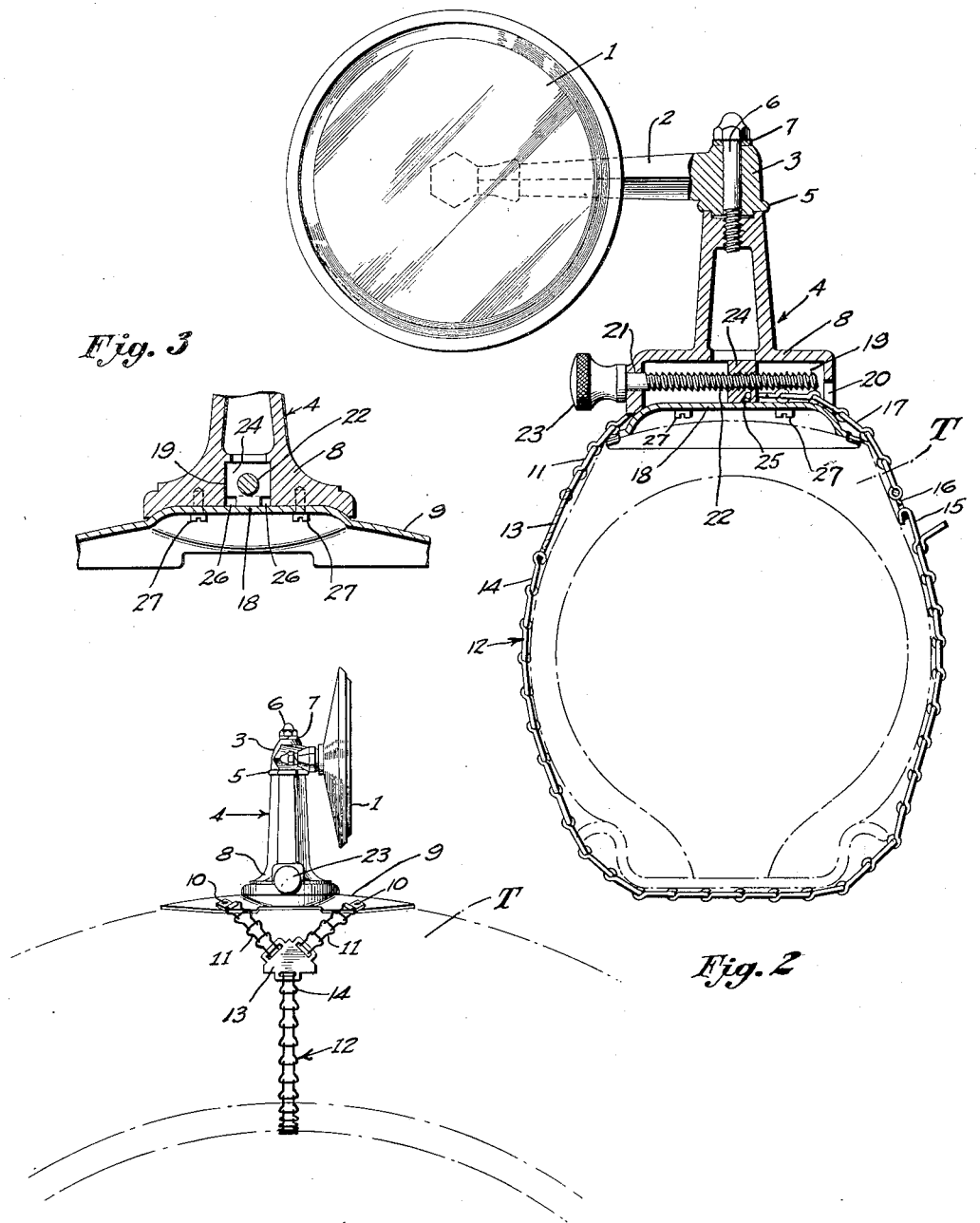

1,917,192

UNITED STATES PATENT OFFICE

HENRY HUEBER, OF BUFFALO, NEW YORK, ASSIGNOR TO TRICO PRODUCTS CORPORATION, OF BUFFALO, NEW YORK

SPARE TIRE MIRROR

Application filed May 15, 1930. Serial No. 452,739.

This invention relates to rear view mirrors and more particularly to that class of mirrors which are adapted to be disposed upon spare tires mounted on the front fenders or running boards of automotive vehicles.

Mirrors of this type are now being widely adopted as the mounting of spare tires in fender wells and on running boards adjacent to the engine hoods of motor cars becomes more usual, spare tires thus disposed providing a very desirable support for rear view mirrors since by this positioning the driver is enabled to easily observe traffic conditions to the rear and side rear of his vehicle.

It is desirable that such a mirror be of neat and simple construction, with parts so arranged as to enable its easy mounting, adjustment and removal from the spare tire. It is also important that the device when on the tire, be securely held in place and not readily twisted from operable position.

When it becomes necessary to use the spare tire or for any other reason to remove the mirror it is essential that the various adjustable parts of the mirror be in working order and not corroded by moisture or jammed by mud and dirt thrown by vehicle wheels upon the roadway.

It is the purpose and object of this invention to provide a rear view mirror incorporating in it the desirable features hereinbefore set forth.

These and other objects are accomplished by the structural formation and arrangement of the parts which will be fully set forth hereinafter, reference being made to the accompanying drawing, of which:

Fig. 1 is a view in side elevation showing the rear view mirror attached to a spare tire, the tire being indicated by broken lines.

Fig. 2 is a vertical section looking toward the front of the vehicle, the spare tire which appears in cross-section being indicated by broken lines.

Fig. 3 is a fragmentary vertical section taken through the center of the device as viewed from the position taken in Fig. 1.

Referring more particularly to the drawing wherein like parts are indicated by the same reference numerals, 1 designates a reflector body mounted in any suitable manner upon the outer end of a supporting arm 2. The inner end of the arm is provided with a boss 3, having a lower extension rotatably fitted into a recess formed in the top of a mirror supporting standard designated generally as 4. The boss is also provided with a peripheral extension of hexagonal shape as indicated at 5 for ready gripping with pliers or a wrench. The upper portion of this supporting standard has a threaded aperture to receive the end of a headed screw 6, which passes through a bore in the boss 3. Between the head of the screw and the boss 3 a conventional lock washer 7 is preferably inserted.

The supporting standard 4 comprises an upper part 8 of cast metal, which is shaped to receive adjusting means hereinafter described, and a lower base or saddle member 9 of stamped metal. The latter is of generally dished formation to fit the contour of an automobile tire shown in broken lines in Figs. 1 and 2 and there indicated at T.

Secured at 10—10 to one side of saddle 9 are sections 11—11 of a flexible anchoring member 12, preferably a link chain. These sections 11—11 are widely separated at their upper ends, converging downwardly and attached at their lower ends to a triangular stirrup 13, at the bottom of which is attached the main section 14 of the anchoring member. This Y-arrangement of the chain parts is designed to prevent twisting of the standard 4 about its vertical axis relative to the tire to which it is attached.

The lower or free end of chain 14 is provided with a hook 15 adapted to engage with a retaining member 16 secured to the free end of another chain section 17 which is secured to adjusting or slack take-up means completely enclosed within the standard 4.

The center of the saddle part 9 is upwardly pressed to fit into a shallow circular recess formed in the bottom of member 8 and provides a substantially flat portion 18 which serves as a seat for the upper part of the standard.

The upper part 8 is provided as shown in

Figs. 2 and 3 with a transverse recessed channel 19 and two small apertures 20 and 21, at opposite ends of the channels. The part 8 converges upwardly as shown in Fig. 3, into an upper extension of comparatively small cross-section. In order to lighten the device it is preferred that this extension be hollow.

A headed shank 22, having a screw threaded inner end, extends through aperture 21, the enlarged manipulating head 23 thereof being disposed outwardly of standard 4. It is preferred that the head be knurled for ready gripping with the fingers or pliers.

Threaded to the shank 22 is an adjusting or slack take-up block 24. The recessed channel in member 8 in conjunction with the flattened surface 18 of member 9 provides a substantially closed guideway in which this block is adapted to slide. As shown in Fig. 3 the block conforms in cross-section to that of the guideway. As illustrated this is substantially square but it may be of any shape other than round.

The take-up block has an inclined recess 25 formed adjacent its bottom surface which forms together with communicating notches 26 a pocket for the reception of the end link of chain section 17, which is passed through aperture 20 into the standard.

It will be observed that when the device is assembled in the manner shown in Fig. 2, the members 8 and 9 being secured together in any suitable manner as by the screws 27, it will be impossible for the end link of section 17 to become disengaged from the block.

When the device has been assembled and is ready to be mounted upon a spare tire the manipulating head 23 is rotated in a counter-clockwise direction, thus moving block 24, which is held against rotation by the walls of recess 19, to the extreme right of the guideway as viewed in Fig. 2. The device is then placed upon a spare tire and the free end of chain section 14 is passed about the tire and the hook 15 engaged with the retaining member 16 on the free end of chain section 17.

The manipulating head 23 is then turned in a clockwise direction drawing the block 24 inwardly from aperture 20. A greater portion of section 17 is thus carried into the standard 4, reducing the effective length, or length of chain outside of the standard. When the anchoring member has been drawn taut the device will be firmly held in position upon the tire since the hook 15 cannot be released until tension is removed from the anchor.

It should be noted that due to the inclination of recess 25 the end link of chain section 17 will be moved upwardly in the recess when tension is applied to the anchoring member, thus eliminating the possibility of the chain end dragging against the saddle 9.

What is claimed is:

1. Means adapted to support a rear view mirror, comprising a standard having an internal guideway, an adjustable take-up block closely fitting said guideway, an inclined recess in said block, one wall of said guideway closing the mouth of the recess, a flexible anchoring member having an end portion engaging said block in said recess, and means for adjusting the position of the take-up block within the guideway.

2. A standard adapted to support a rear view mirror, having a guideway formed therein, a slidably adjustable take-up block closely fitting within said guideway, said block having a recess extending inwardly from a surface in contact with a wall of said guideway and notches communicating with said recess and extending to one end face of the block, a flexible anchoring member comprising a link chain, the end link of which engages said block in said recess and notches, and means for adjusting the position of the take-up block within the guideway.

3. Means adapted to support a vehicle accessory on a spare tire, comprising a multi-part supporting standard including an upper part having a channel formed in the base thereof superposed upon a lower saddle part, the upper surface of the saddle part forming in conjunction with the channeled upper part a substantially closed guideway of uniform cross-section, an adjustable take-up block in said guideway adapted for sliding movement therein, an anchoring member engaging said take-up block, and means for moving the take-up block within the guideway.

4. Bracket means adapted for attachment to a spare tire, comprising a supporting standard having a saddle part adapted to rest on a spare tire, take-up means within said standard, a flexible anchoring member adapted to be passed about the spare tire, said anchoring member comprising a section having an end of substantially Y-shape, the upper portions of the Y being secured to the saddle portion of said standard in widely spaced relation, another section of said anchoring member secured at one end to said take-up means within said standard, and hook means associated with the free end of one of said sections adapted to be connected to the free end of the other of said sections.

5. In combination with a resilient spare tire, means adapted to support a reflective body thereon including a supporting standard having a guideway formed therein, said standard having an enlarged base overlying and formed to conform to the surface of the tire, a take-up block slidable in the guideway, a flexible anchoring member engaging said take-up block and extending about said tire, and means for varying the position of said block within the guideway, whereby the effective length of the anchoring member may be decreased to compress the resilient tire and firmly anchor the standard thereto.

6. In means adapted to support a vehicle accessory upon a spare tire, a standard comprising a body having an elongated channel in the base thereof and a plate for abutment with the spare tire and extending across the base of the body to form with the channel a substantially closed guideway, a take-up block slidable longitudinally in said guideway, a flexible anchoring member passing about said spare tire and having one end engaged with the standard, the opposite end of the flexible anchoring member extending through the standard and engaging said take-up block, and means for varying the position of the take-up block within the guideway.

HENRY HUEBER.